March 26, 1946. F. V. DONALD 2,397,310
SICKLE BAR MOWER ATTACHMENT FOR GARDEN TRACTORS
Filed Dec. 24, 1943
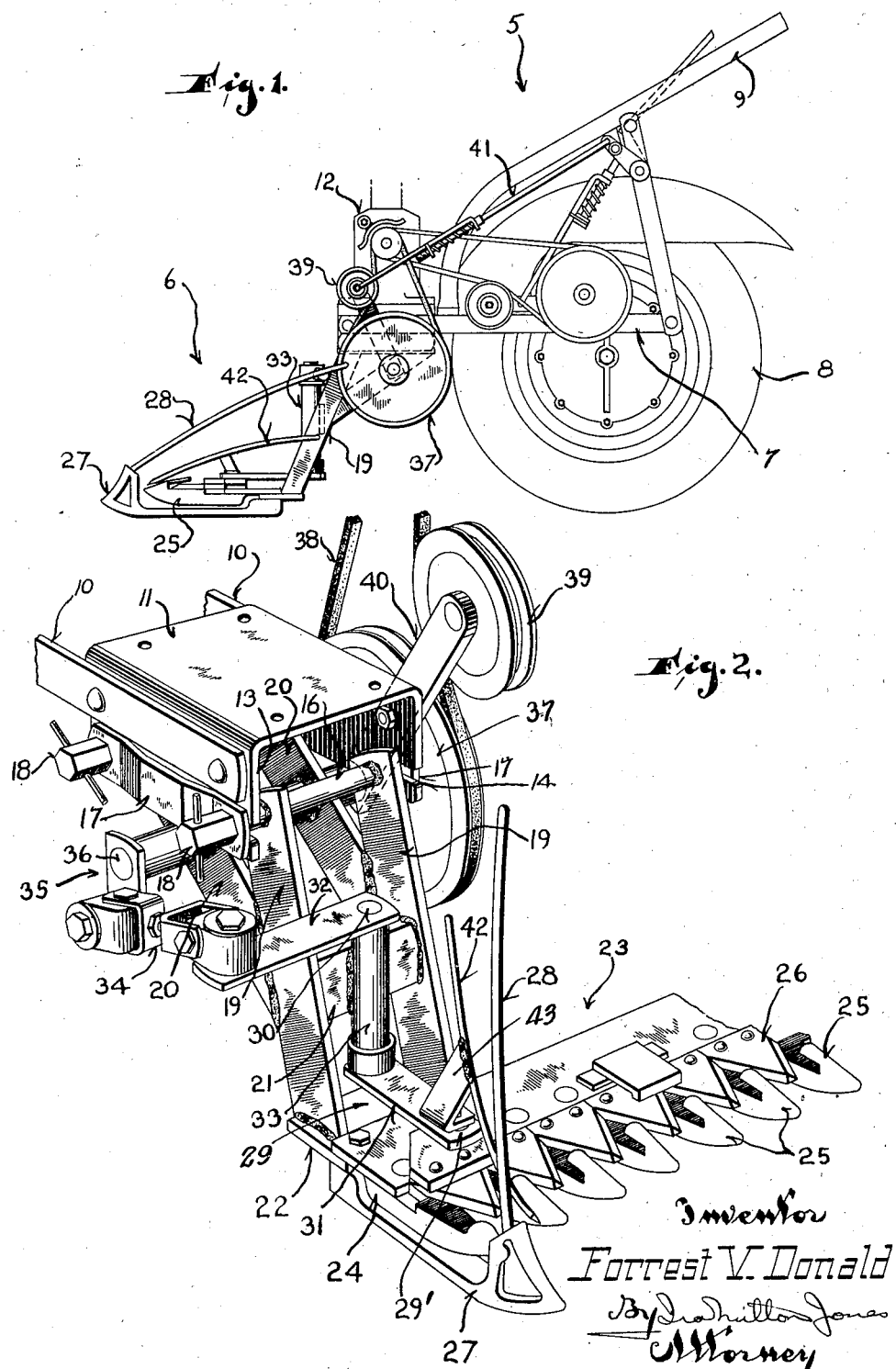
Inventor
Forrest V. Donald Patented Mar. 26, 1946

2,397,310

UNITED STATES PATENT OFFICE 2,397,310

SICKLE BAR MOWER ATTACHMENT FOR GARDEN TRACTORS

Forrest V. Donald, Port Washington, Wis., assignor to Simplicity Manufacturing Company, Port Washington, Wis., a corporation of Wisconsin Original application November 19, 1941, Serial No. 419,708. Divided and this application December 24, 1943, Serial No. 515,491

2 Claims. (Cl. 56—26.5)

This invention relates to sickle bar mowers and particularly to a sickle bar mower attachment for garden tractors, and is a division of the copending application of Forrest V. Donald, Serial No. 419,708, filed November 19, 1941, now Patent No. 2,368,290.

The garden tractor which constitutes the subject matter of the aforesaid application has a frame supported on a single traction wheel. At its front end this frame mounts an engine base upon which the engine for the tractor is positioned; and beneath the engine base means are provided for quickly detachably fastening various implements and attachments to the frame. One of the attachments adapted to be so fastened to the frame of the tractor is the sickle bar mower of the present invention.

When mounted in position, the sickle bar mower attachment extends transversely in front of the tractor and thus permits cutting tall grass and weeds in the path of the tractor and to the side thereof due to the lateral projection of the sickle bar.

One of the objects of this invention is to provide an attachment of this type which when mounted in position will be rigid and capable of relatively hard use.

Another object of this invention is to provide a simple effective manner of driving the cutter bar of the mower from the tractor engine.

In this connection, it is a further object of this invention to provide a drive transmission which may be easily and quickly established or released.

With the above and other objects in view which will appear as the description proceeds, this invention resides in the novel construction, combination and arrangement of parts substantally as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a side view of a tractor having the sickle bar mower attachment of this invention mounted thereon; and Figure 2 is a perspective view of the sickle bar mower per se and showing only that much of the tractor frame as is necessary to bring out the relationship therebetween, one end portion of the sickle bar being cut away.

Referring now particularly to the accompanying drawing in which like numerals indicate like parts, the numeral 5 designates generally the tractor to which the sickle bar mower attachment 6 is releasably secured. As fully described in the aforesaid application, Serial No. 419,708, now Patent No. 2,368,290, the tractor 5 has a substantially horizontal frame 7 mounted on a traction wheel 8. While the specific tractor shown has only one traction wheel, it is apparent that a pair of wheels may be substituted without deviating from the invention.

The usual handle bars 9 extend upwardly and rearwardly from the frame. The front end of the frame consists of two parallel side bars 10 connected by an inverted U shaped stamping 11. The tractor engine 12 is mounted on top of the stamping 11. The side flanges 13 of the stamping are secured to the frame bars 10, and project therebeneath to provide means for securing the sickle bar mower attachment and other implements to the tractor frame.

The manner in which this attachment is effected constitutes no part of the present invention and is fully covered in the aforesaid application.

For the present, it is sufficient to note that the lower portions of the flanges 13 have horizontal notches 14 opening to the front end thereof and substantially vertical notches (not shown) opening to the bottom edge thereof near their rear ends. These notches are adapted to receive screws (not shown) carried in tubular cross bars 16 only one of which is shown, and which constitute part of the implement frame. Clamping plates 17 are clamped against the outer faces of the side flanges 13 by tightening nuts 18 threaded on the screws (not shown) of the cross bars 16 to secure the implement frame to the tractor frame. One of the clamping plates lies between the nuts 18 and the adjacent flange while the other is drawn against the opposite side flange 13 by the heads of the screws.

In the present instance the tubular cross bars 16 are secured to and connect upwardly and rearwardly extending frame members 19 and 20, the latter being welded to the former and extending rearwardly at a greater angle. Substantially at the juncture of these frame members a cross piece 21 connects the frame members 19 and another cross piece 22 connects the lower ends of the frame members 19. The cross piece 22 has the sickle bar proper indicated generally by the numeral 23 secured thereto and extending to one side thereof.

The sickle bar per se consists of the usual stationary member 24 the forward edge of which has comb like teeth 25 provided with the customary knives, and a reciprocating cutter bar 26 the knives of which coact with the stationary knives. The cutter bar 26 is suitably guided for reciprocation in guideways on the stationary part of the bar.

As is customary shoes 27 (only one of which is shown) are provided at opposite ends of the sickle bar, and a guard 28 extends upwardly and laterally from one of the shoes to guide the cuttings to the side of the drive mechanism.

The means for reciprocating the cutter bar 26 comprises a bell crank lever 29 consisting of a vertical shaft 30 and angularly disposed lever arms 31 and 32. The shaft 30 is journalled in suitable bearings mounted in an upright tubular bearing housing 33 welded or otherwise secured to the cross piece 21 of the sickle bar frame. The lower lever arm 31 has its free end pivotally connected to the cutter bar as at 29' and the upper lever arm 32 has its free end connected by a pitman 34 with the pin of a crank 35.

The crank 35 is mounted on a cross shaft 36 journalled in bearings suitably mounted in the sickle bar frame and extending to the opposite side thereof to mount a drive pulley 37. The pulley 37 is adapted to be driven from the engine by means of a belt 38 the tension of which is manually controlled by an idler 39.

The idler 39 is mounted on a pivoted arm 40 and is adapted to be pulled against the belt by a link 41 connected with the manually operated control mechanism of the tractor as clearly shown in Figure 1. As will be readily apparent by pulling the idler back, the tension of the belt 38 is increased and power is transmitted from the engine to the pulley 37. Rotation of the pulley 37 acting through the crank 35 oscillates the connected levers 32 and 31 to reciprocate the cutter bar.

Mounted on the outer end of the lever arm 31 so as to be oscillated bodily thereby is a deflector guard 42. This deflector guard comprises a slightly bent or bowed rod secured at its midportion to the upstanding leg of a clip angle 43 carried by the outer end portion of the lever arm 31 adjacent to the pivotal connection 29' of the lever arm with the cutting blade. The rod 42 lies nearly horizontal and extends from a point adjacent to the guard 28 at the forward end of the rod rearwardly over the sickle bar and terminates alongside the outermost frame member 19 between the frame structure and the projecting end of the sickle bar so as to lie substantially crosswise in front of the frame structure.

In this position the rod helps deflect cuttings away from the frame structure and throws the cuttings over the projecting end of the sickle bar and hence onto the cut swath and away from the uncut stand by its bodily oscillation with the outer end of the lever arm 31.

From the foregoing description taken in connection with the accompanying drawing, it will be readily apparent to those skilled in the art that this invention provides an exceedingly simple but efficient sickle bar mower attachment for garden tractors.

What I claim as my invention is:

1. A mower attachment for tractors comprising: a sickle bar including a reciprocable cutting blade; a frame structure connected to one end portion of the sickle bar for supporting the same from a tractor with the opposite end of the sickle bar projecting laterally to one side of the frame structure; power driven means carried by the frame structure including an oscillatory member connected with the cutting blade for imparting reciprocatory motion thereof; and a deflector rod connected to said oscillatory member medially of the ends of the rod to move bodily with the oscillatory member, said rod lying in a substantially horizontal position and extending over the sickle bar substantially diagonally crosswise in front of the frame structure with its rear end portion disposed alongside the frame structure at the side thereof facing the projecting end of the sickle bar.

2. A mower attachment for tractors comprising: a sickle bar including a reciprocable cutting blade; a frame structure connected to one end portion of the sickle bar for supporting the same from a tractor with the opposite end of the sickle bar projecting laterally to one side of the frame structure; power driven means carried by the frame structure including an oscillatory member connected with the cutting blade for imparting reciprocatory motion thereto; a deflector rod connected to said oscillatory member medially of the ends of the rod to move bodily with the oscillatory member, said rod lying in a substantially horizontal position and extending over the sickle bar substantially diagonally crosswise in front of the frame structure with its rear end portion disposed alongside the frame structure at the side thereof facing the projecting end of the sickle bar for throwing cuttings over the sickle bar toward the projecting end of the bar; and a stationary guide bar carried by a non-reciprocating portion of the sickle bar adjacent to the forward end of the deflector rod to deflect material to be cut away from the frame structure and into the path of motion of the deflector rod.

FORREST V. DONALD.